United States Patent
Felstead

[15] 3,677,321
[45] July 18, 1972

[54] SPRAY-DRYING PROCESS
[72] Inventor: Edward Felstead, Runcorn, England
[73] Assignee: Imperial Chemical Industries Limited, London, England
[22] Filed: Jan. 13, 1970
[21] Appl. No.: 2,668

[30] Foreign Application Priority Data
Jan. 27, 1969 Great Britain..........................4,445/69

[52] U.S. Cl. .......................159/48, 159/4 CC, 260/94.7 HA
[51] Int. Cl. ......................B01d 1/16, C08f 1/88, F26b 3/12, C08d 5/06
[58] Field of Search....................159/48, 48 L; 260/92.3, 96, 260/94.7, 772, 94.7 HA, 91.5, 91.7

[56] References Cited
UNITED STATES PATENTS

| | | |
|---|---|---|
| 2,426,127 | 8/1947 | Thomas et al..........................260/96 X |
| 3,241,600 | 3/1966 | Whitehouse.............................159/48 |
| 3,320,220 | 5/1967 | Drusco et al..........................260/96 X |
| 3,437,645 | 4/1969 | Paige et al...........................260/96 X |
| 2,345,507 | 3/1944 | Smith..................................260/772 |
| 3,499,883 | 3/1970 | Rosen .............................260/94.7 HA |
| 3,501,449 | 3/1970 | Thorpe et al.....................260/94.7 HA |
| 3,442,884 | 5/1969 | Hoch et al.......................260/94.7 HA |
| 3,547,865 | 12/1970 | Hoch et al.......................260/94.7 HA |

Primary Examiner—Norman Yudkoff
Assistant Examiner—G. J. Sofer
Attorney—Cushman, Darby & Cushman

[57] ABSTRACT

The spray-drying of solutions of chlorinated polydienes is carried out by atomizing the solution into an evaporation zone maintained at a temperature below 75° C through which gas is flowing.

10 Claims, 1 Drawing Figure

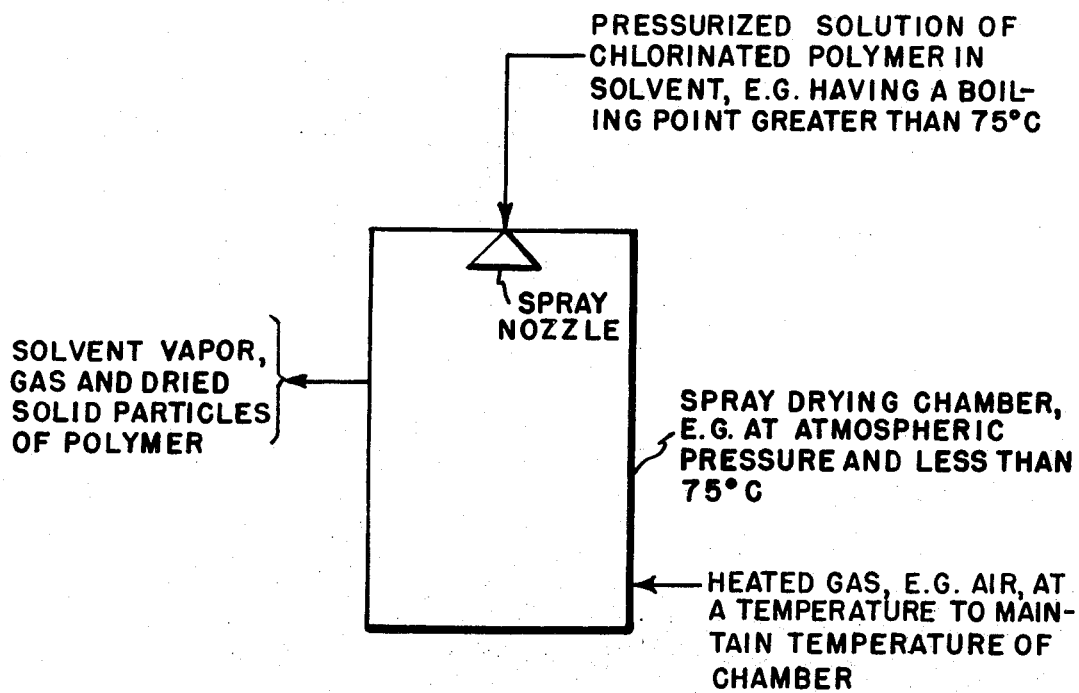

SPRAY-DRYING PROCESS

This invention relates to a process for spray-drying polymer solutions and in particular to a process for the spray-drying of solutions of chlorinated diene polymers.

It is known that solutions and suspensions of some polymers may be rapidly evaporated to form dry particles by spray-drying i.e. evaporation of solvent by spraying the solution into a hot atmosphere.

Many polymer solutions are not amenable to spray-drying either because they are difficult to atomize or because the solid particles are too fluffy, tacky or otherwise unsuitable to extract from the drying apparatus.

Chlorinated diene polymers fall into the category of polymers difficult to extract rapidly from solution by spray-drying and preliminary attempts were not successful. We have now found that if the solution is atomized continuously into an atmosphere at the correct temperature solid particles are obtained which may be removed continuously from the drying apparatus.

Thus according to our invention we provide a method of spray-drying a solution of a chlorine-containing polymer derived from an aliphatic diene which comprises atomizing the solution into an evaporation zone wherein the said solution encounters a flowing gas, the temperature within the said zone being less than 75° C.

Whereas the use of temperatures greater than 75° C produces powders which are difficult to handle, the present invention provides polymer particles which are free-flowing and which have a packing density greater than 40 gm/liter, and may be in the range 150–350 gm/liter, as they emerge from the dryer. In this form they may be removed readily from the drying apparatus in an air stream and separated continuously by a cyclone separator. Other continuous methods of separation of the solid may be employed, for example a form of deposition on to an electrostatically-charged plate from which polymer is removed by scraping, or an electrostatically-charged surface forming part of a conveyor belt.

When the polymer emerges from the spray-dryer some solvent may be entrained in the particles, and the powders may be given a further drying if desired but after the present spray-drying process they are usually sufficiently dry to be ball-milled. Ball-milling is the conventional method used to produce particles of chlorinated diene polymers having the desired packing density and may be carried out subsequent to the spray-drying process to produce polymer of even higher packing density, for example a packing density of 400–450 gm/liter is desirable in the case of chlorinated polyisoprenes.

Polymers which are conveniently separated from solution by this process are chlorine-containing polymers derived from aliphatic dienes either by the chlorination of a polymer (for example a synthetic polyisoprene, a synthetic polybutadiene or a natural rubber) or by the polymerization of a chlorine-containing monomer (for example 2-chloroisoprene).

The process is especially applicable to polymers obtained by the chlorination of natural and synthetic polyisoprenes in solution, for example polymers having a chlorine content within the range 50–75 percent by weight and preferably within the range 62–68 percent by weight.

The solution to be dried by the process of this invention is that of one of the polymers hereinbefore described dissolved in a suitable solvent. The solvent will be most conveniently that in which the chlorination has been carried out, and the most common solvent for this purpose is carbon tetrachloride. Other saturated solvents containing a large proportion of chlorine may be used, for example one or more of chloroform, dichlorobromomethane, bromotrichloromethane, tetrachloroethane and tetrachlorodifluoroethane, either alone or used in mixtures with carbon tetrachloride. The process operates most efficiently with solvents having boiling points close to that of carbon tetrachloride and preferably the solution comprises a major proportion of carbon tetrachloride.

It is not necessary that the solvents be free from water but if sufficient water is present to form a second liquid phase it is preferred to add an emulsifying agent in order to maintain a uniform and stable suspension of water throughout the polymer solution.

The concentration of chlorine-containing polymer in solution should be adjusted to allow atomization into discrete droplets of solution. The concentration which is suitable will vary with the molecular weight of the polymer in solution and a suitable concentration may readily be found by trial. For example a solution of chlorinated polyisoprene ("Alloprene" Grade 20 c.p.; "Alloprene" is a Registered Trade Mark) in carbon tetrachloride has been found to atomize satisfactorily at concentrations below 5 percent by weight but it is preferable to reduce the concentration to approximately 4 percent, at which concentration the viscosity of the solution was observed to be 3.6 centipoises. If the concentration is reduced well below this level, for instance to 1 percent the solution may be sprayed satisfactorily but the process is inefficient because, for a unit weight of solid polymer produced, large amounts of heat energy are required to evaporate the solvent. Therefore a concentration of solution close to the concentration limit for suitable atomization should be chosen as exemplified above.

The polymer solution is conveyed to an atomizer for example by being fed under pressure to a spray nozzle; the exact pressure is not critical provided it is sufficient to generate a mist-like spray. The spray of polymer solution is optionally arranged to emerge either from a single orifice designed to produce a hollow conical-shaped discharge or from a plurality of such nozzles suitably arranged. A fine-mist spray should be produced, for example a spray having solution droplets between 10 and 500 microns in diameter, preferably between 20 and 100 microns.

The spray nozzle or nozzles are arranged to discharge the solution into a chamber preferably at atmospheric pressure or lower in which a gas is flowing, for example in a stream or in circulatory currents. The flow of gas through the evaporation zone in the chamber may be obtained in a variety of ways for example by the injection of pressurized air or by a mechanically-driven impeller situated either inside or outside the chamber. The movement of gas in the chamber is preferably designed to sweep the partially-dried particles away from the walls of the chamber to minimize adhesion thereto.

Heat is supplied to the evaporation zone preferably by heating the gas entering the chamber to a temperature considerably above the temperature at which the evaporation zone is maintained. Some of the heat is lost from the incoming air by conduction to the walls or other parts of the apparatus and some is used to provide the latent heat of vaporization of the solvent. The evaporation zone is maintained at a substantially uniform temperature and this temperature may conveniently be measured under operating conditions near the vapor outlet of the chamber. The temperature of the said zone, measured as the temperature of the gaseous/solid suspension when steady-state conditions have been established, is below 75° C; a convenient range is, for example, 20° to 65° C but preferably the range is from 25° to 55° C in order to produce polymer particles of the desired packing density as hereinbefore described.

The temperature of the gas entering the chamber will usually be above 80° C and may be between 100° C and 200° C in order to maintain the required temperature at the outlet. With suitable flexibility in the control of heat input to the incoming gas and the rate of spraying of the polymer solution a convenient heat balance may be established such that a constant temperature is observed at the outlet of the chamber and a uniform weight of dried polymer per unit time is collected.

The gas used to convey heat into the evaporation chamber and carry the solid product from the chamber may be any gas not reactive to the polymer at the temperature of the drying process. Air is the most convenient gas for this purpose and is preferably employed but other gases, for example nitrogen, argon or carbon dioxide, would be suitable but more expensive. Optionally solvent vapor and if desired other gases too may be re-circulated to the evaporation zone after the polymer particles have been separated: this provides a method by which at any chosen temperature and pressure the rate of evaporation of the droplets of solution may be further controlled.

The invention is illustrated but not limited by the following Examples:

EXAMPLE 1

A solution containing 4 percent by weight of chlorinated polyisoprene in carbon tetrachloride was fed at a pressure of 100 p.s.i. to a drying chamber into which hot air was flowing from an independent pipe at a rate of 55 cu.ft. per minute. The chlorinated rubber solution was atomized into a hollow conical spray through a nozzle having a spray angle of 80° at a rate of 6 liters per hour. The solid particles of polymer produced were carried out of the chamber by the air flow and separated in a conventional cyclone separator.

The packing density of the product obtained by conducting the above experiment with air at different temperatures was measured. The results are summarized in Table 1.

TABLE 1

| Temperature of Air °C | | Packing Density of Product g/liter | % Solvent by weight in product |
|---|---|---|---|
| Inlet | Outlet | | |
| 165 | 55 | 120 | 19.0 |
| 150 | 55 | 115 | 19.5 |
| 168 | 52 | 120 | 19.1 |
| 195 | 65 | 50 | 13.4 |
| 114 | 45 | 200 | 14.8 |
| 96 | 36 | 214 | 16.8 |

EXAMPLE 2

A spray-drying experiment was conducted with identical concentration of solution, feed pressure, and flow rates of air and polymer solution as in Example 1. In this experiment the difference being that the air used and a portion of the solvent vapor were continuously reheated and returned to the evaporation chamber after the polymer particles had been separated in a cyclone separator. The results obtained are shown in Table 2.

TABLE 2

| Temperature of Air °C | | Packing Density of Product g/liter | % Solvent by weight in product |
|---|---|---|---|
| Inlet | Outlet | | |
| 135 | 39 | 260 | 13.4 |
| 144 | 50 | 133 | 12.7 |
| 151 | 50 | 182 | 12.6 |
| 152 | 55 | 154 | 14.9 |

I claim:

1. A method of spray-drying a solution of a chlorine-containing polymer derived from an aliphatic diene which contains from 50 to 75 percent by weight of chlorine, the step of which consists essentially of atomizing a solution of said polymer in a solvent therefor which solvent is selected from the group consisting of carbon tetrachloride, dichlorobromomethane, bromotrichloromethane, tetrachloroethane, tetrachlorodifluoroethane and mixtures of a major portion of carbontetrachloride and a minor proportion of at least one member selected from the group consisting of dichlorobromomethane, bromotrichloromethane, tetrachloroethane and tetrachlorodifluoroethane into an evaporation zone wherein the solution encounters a flowing gas selected from the group consisting essentially of air, nitrogen, argon and carbon dioxide to dry the polymer, the temperature within the said zone being less than 75° C, and removing the dried particles of polymer from the said zone in the gas stream exiting the said zone and separating the dried polymer from the gas stream.

2. A method as claimed in claim 1 wherein the concentration of polymer in solution is less than 5 percent by weight.

3. A method as claimed in claim 1 wherein the solvent is that in which the polymer was chlorinated.

4. A method as claimed in claim 1 wherein the solvent has a boiling point close to the boiling point of carbontetrachloride.

5. A method as claimed in claim 1 wherein the polymer is a chlorinated polyisoprene or a chlorinated natural rubber.

6. A method as claimed in claim 5 wherein the polymer contains from 62 to 68 percent by weight of chlorine.

7. A method as claimed in claim 1 wherein the temperature within the evaporation zone is from 20° to 65° C.

8. A method as claimed in claim 7 wherein the temperature within the evaporation zone is from 25° to 55° C.

9. A method as claimed in claim 1 wherein the solution is atomized through one or more spray-nozzles.

10. A method as claimed in claim 9 wherein the solution is atomized through a spray-nozzle producing a hollow, conical discharge.

* * * * *